United States Patent
Hashimoto

(10) Patent No.: US 10,767,341 B2
(45) Date of Patent: *Sep. 8, 2020

(54) CONTROL SYSTEM FOR WORK VEHICLE, AND METHOD FOR SETTING TRAJECTORY OF WORK IMPLEMENT

(71) Applicant: KOMATSU LTD., Tokyo (JP)

(72) Inventor: Kazuhiro Hashimoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 257 days.

This patent is subject to a terminal disclaimer.

(21) Appl. No.: 15/579,982

(22) PCT Filed: Jan. 31, 2017

(86) PCT No.: PCT/JP2017/003371
§ 371 (c)(1),
(2) Date: Dec. 6, 2017

(87) PCT Pub. No.: WO2018/142453
PCT Pub. Date: Aug. 9, 2018

(65) Prior Publication Data
US 2019/0218745 A1 Jul. 18, 2019

(51) Int. Cl.
*E02F 3/43* (2006.01)
*E02F 9/20* (2006.01)
(Continued)

(52) U.S. Cl.
CPC ................ *E02F 3/43* (2013.01); *E02F 3/815* (2013.01); *E02F 3/84* (2013.01); *E02F 9/20* (2013.01);
(Continued)

(58) Field of Classification Search
CPC ...... E02F 3/43; E02F 3/815; E02F 3/84; E02F 9/20; G05D 1/0274; G05D 2201/0202
See application file for complete search history.

(56) References Cited

U.S. PATENT DOCUMENTS 5,854,988 A 12/1998 Davidson et al.
6,701,239 B2 * 3/2004 Keefer .................. E02F 3/842
37/414
(Continued)

FOREIGN PATENT DOCUMENTS

JP 8-506870 A 7/1996
JP 2007-77800 A 3/2007
(Continued)

OTHER PUBLICATIONS

US 5,526,002 A, 06/1996, Gudat et al. (withdrawn)
(Continued)

*Primary Examiner* — Michael J Zanelli
(74) *Attorney, Agent, or Firm* — Global IP Counselors, LLP

(57) ABSTRACT

A control system includes a controller. The controller acquires current terrain data that indicates the current terrain to be worked. The controller decides on a target design terrain that is displaced vertically from the current terrain by referring to target displacement data. The target displacement data indicates the target displacement of a work implement according to the amount of movement from a work start position. The controller generates a command signal to move the work implement toward the target design terrain.

24 Claims, 12 Drawing Sheets

(51) Int. Cl.
*E02F 3/84* (2006.01)
*E02F 3/815* (2006.01)
*G05D 1/02* (2020.01)

(52) U.S. Cl.
CPC ... *G05D 1/0274* (2013.01); *G05D 2201/0202* (2013.01)

(56) References Cited

U.S. PATENT DOCUMENTS

| | | | |
|---|---|---|---|
| 2003/0075970 A1 | 4/2003 | Hainsworth et al. | |
| 2003/0195687 A1* | 10/2003 | Keefer | E02F 3/842 |
| | | | 701/50 |
| 2010/0250023 A1* | 9/2010 | Gudat | E02F 9/2045 |
| | | | 701/2 |
| 2012/0136508 A1* | 5/2012 | Taylor | E02F 9/2045 |
| | | | 701/2 |
| 2013/0081831 A1 | 4/2013 | Hayashi | |
| 2014/0180444 A1 | 6/2014 | Edara et al. | |
| 2014/0257646 A1 | 9/2014 | Ishibashi et al. | |
| 2015/0240453 A1* | 8/2015 | Jaliwala | E02F 9/2041 |
| | | | 701/50 |
| 2016/0076223 A1* | 3/2016 | Wei | E02F 9/2029 |
| | | | 701/50 |
| 2016/0123145 A1 | 5/2016 | Vvestphalen et al. | |
| 2017/0220044 A1 | 8/2017 | Sakai et al. | |

FOREIGN PATENT DOCUMENTS

| | | |
|---|---|---|
| JP | 2012-255286 A | 12/2012 |
| JP | 5247939 B1 | 7/2013 |
| JP | 2014-173321 A | 9/2014 |
| JP | 2014-190134 A | 10/2014 |
| WO | 2016093374 A1 | 6/2016 |

OTHER PUBLICATIONS

The International Search Report for the corresponding international application No. PCT/JP2017/003371, dated Feb. 28, 2017.
Examination Report No. 1 for the corresponding Australian application No. 2017272178, dated Jun. 15, 2018.
The Office Action of the corresponding Japanese application No. 2017-566888, dated Aug. 4, 2020.

* cited by examiner

CONTROL SYSTEM FOR WORK VEHICLE, AND METHOD FOR SETTING TRAJECTORY OF WORK IMPLEMENT

CROSS-REFERENCE TO RELATED APPLICATIONS

This application is a U.S. National stage application of International Application No. PCT/JP2017/003371, filed on Jan. 31, 2017.

BACKGROUND

Field of the Invention

The present invention relates to a control system for a work vehicle, and to a method for setting the trajectory of a work implement.

Description of the Related Art

It has been proposed in the past that with a bulldozer, a grader, or another such work vehicle, control be performed to automatically adjust the position of a blade or other such work implement. For instance, in Japanese Patent No. 5,247,939, the position of the blade is automatically adjusted by load control that makes the load on the blade match a target load in digging work.

SUMMARY

With the conventional control mentioned above, the occurrence of track slippage can be suppressed by raising the blade when the load on the blade becomes excessively high. This allows the work to be performed more efficiently.

However, with conventional control, as shown in FIG. 12, the blade is first controlled to conform to a design terrain 100. If the load on the blade subsequently increases, the blade is raised by load control (see the trajectory 200 of the blade in FIG. 12). Therefore, when digging a terrain 300 with large undulations, the load exerted on the blade may increase rapidly, causing the blade to rise suddenly. If that happens, a very uneven terrain will be formed, making it difficult to perform digging work smoothly. Also, there is a risk that the terrain being dug will be prone to becoming rough and the finish quality will suffer.

It is an object of the present invention to allow a work vehicle to perform work efficiently and with good finish quality by means of automatic control.

A first aspect is a control system for a work vehicle including a work implement. The control system includes a controller. The controller acquires current terrain data indicating the current terrain to be worked. The controller decides on a target design terrain that is displaced vertically from the current terrain by referring to the target displacement data. The target displacement data indicates the target displacement of the work implement according to the amount of movement from a work start position. The controller generates a command signal for moving the work implement towards the target design terrain.

The second aspect is a method for setting the trajectory of a work implement of a work vehicle. The method includes the following processing. The first processing is to acquire current terrain data indicating the current terrain to be worked. The second processing is to decide a target design surface that is displaced vertically from the current terrain by referring to the target displacement data. The target displacement data indicates the target displacement of the work implement according to the amount of movement from the work start position.

A third aspect is a control system for a work vehicle including a work implement. The control system includes a controller. The controller acquires current terrain data indicating the current terrain to be worked. The controller decides on a target design terrain that is displaced vertically from the current terrain by referring to target load parameter data. The target load parameter data defines the relationship between the amount of movement from the work start position and a target load parameter related to the load on the work implement. The controller generates a command signal for moving the work implement toward the target design terrain.

A fourth aspect is a control system for controlling the blade of a work vehicle. The control system includes a controller. The controller acquires current terrain data. The current terrain data indicates the shape of the surface of the work site. The controller decides on target design terrain data based on the amount of movement and the current terrain data. The amount of movement is the distance traveled from the work start point in a path of travel of the blade. The controller controls the blade according to the target design terrain data.

Effects of the Invention

With the present invention, a work vehicle can be made to perform work efficiently and with good finish quality by automatic control.

DETAILED DESCRIPTION OF EMBODIMENT(S)

Figure 1:
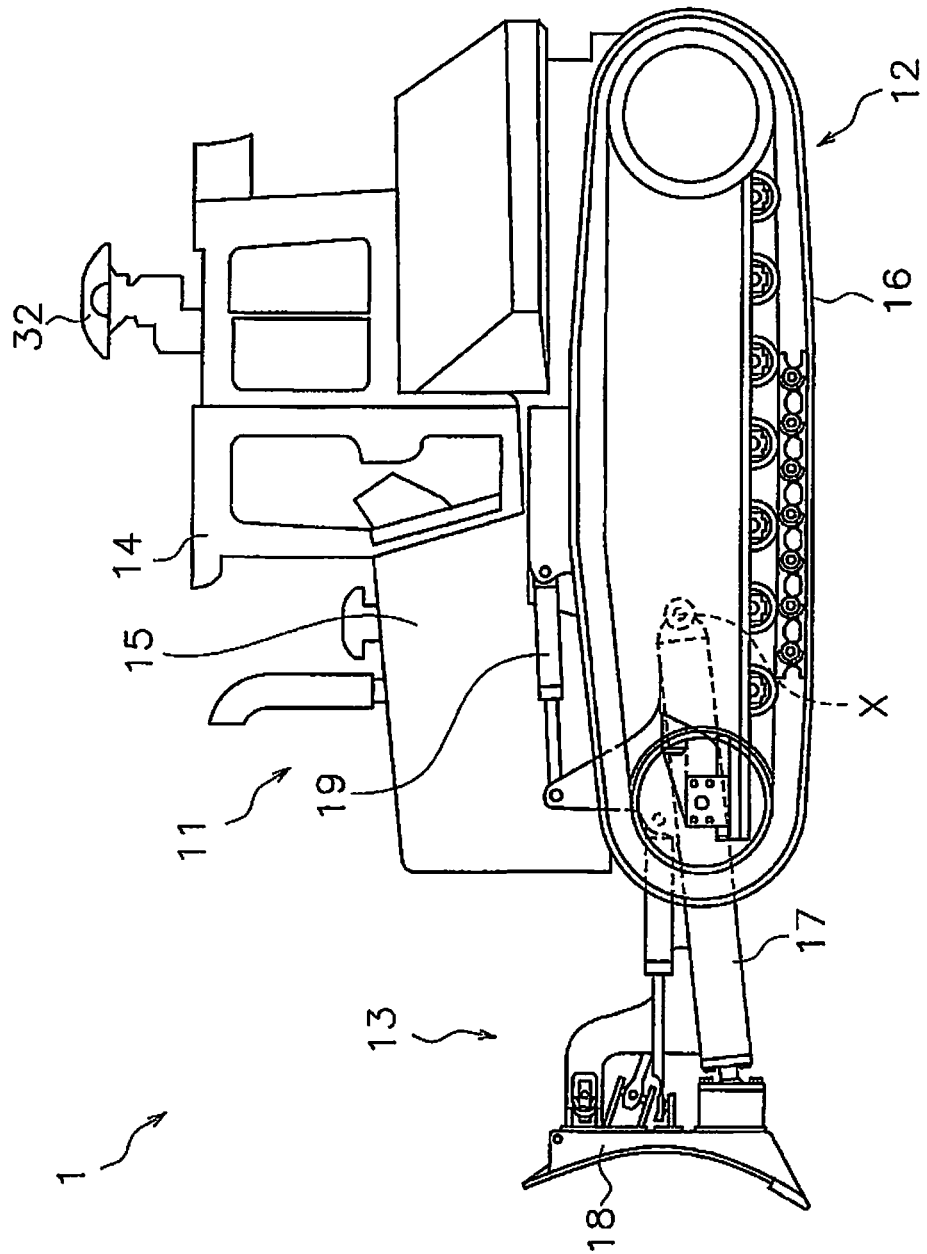
FIG. 1 is a side view of a work vehicle according to an embodiment.

The work vehicle according to an embodiment will now be described through reference to the drawings. FIG. 1 is a side view of a work vehicle 1 according to an embodiment. The work vehicle 1 according to this embodiment is a bulldozer. The work vehicle 1 includes a vehicle body 11, a drive unit 12, and a work implement 13.

The vehicle body 11 includes a cab 14 and an engine compartment 15. A driver's seat (not shown) is disposed in the cab 14. The engine compartment 15 is disposed in front of the cab 14. The drive unit 12 is attached to the lower portion of the vehicle body 11. The drive unit 12 includes a pair of right and left crawler belts 16. Only the left crawler belt 16 is shown in FIG. 1. Rotation of the crawler belts 16 propels the work vehicle 1. The travel of the work vehicle 1 may be either autonomous travel, semi-autonomous travel, or travel under operation by the operator.

The work implement 13 is attached to the vehicle body 11. The work implement 13 includes a lift frame 17, a blade 18, and a lift cylinder 19.

The lift frame 17 is attached to the vehicle body 11 so as to be movable up and down around an axis X extending in the vehicle width direction. The lift frame 17 supports the blade 18. The blade 18 is disposed in front of the vehicle body 11. The blade 18 moves up and down as the lift frame 17 moves up and down.

The lift cylinder 19 is linked to the vehicle body 11 and the lift frame 17. As the lift cylinder 19 expands and contracts, the lift frame 17 rotates up and down around the axis X.

Figure 2:
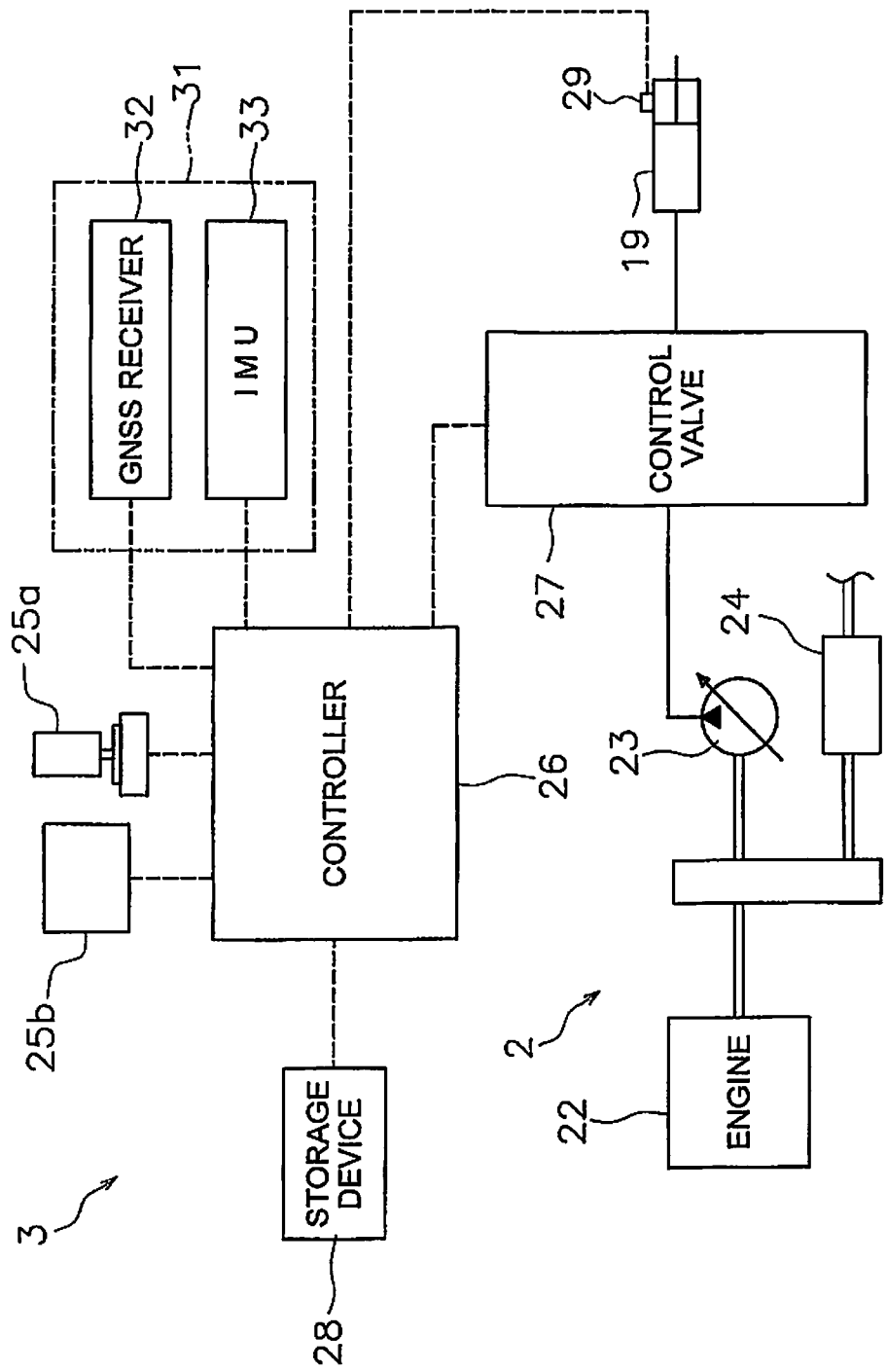
FIG. 2 is a block diagram of the configuration of the drive system and the control system of the work vehicle.

FIG. 2 is a block diagram of the configuration of the drive system 2 and the control system 3 of the work vehicle 1. As shown in FIG. 2, the drive system 2 includes an engine 22, a hydraulic pump 23, and a power transmission device 24.

The hydraulic pump 23 is driven by the engine 22 and discharges hydraulic fluid. The hydraulic fluid discharged from the hydraulic pump 23 is supplied to the lift cylinder 19. In FIG. 2, just one hydraulic pump 23 is shown, but a plurality of hydraulic pumps may be provided.

The power transmission device 24 transmits the drive force of the engine 22 to the drive unit 12. The power transmission device 24 may be, for example, a hydro-static transmission (HST). Alternatively, the power transmission device 24 may be, for example, a torque converter or a transmission having a plurality of gears.

The control system 3 includes an operating device 25a, a control mode setting device 25b, a controller 26, and a control valve 27. The operating device 25a is used to operate the work implement 13 and the drive unit 12. The operating device 25a is disposed in the cab 14. The operating device 25a receives operator inputs for driving the work implement 13 and the drive unit 12, and outputs an operation signal corresponding to the input. The operating device 25a includes, for example, a control lever, a pedal, a switch, or the like.

For example, the operating device 25a for the drive unit 12 is provided to allow for operation in a forward position, a reverse position, and a neutral position. An operation signal indicating the position of the operating device 25a is outputted to the controller 26. When the operation position of the operating device 25a is the forward position, the controller 26 controls the drive unit 12 or the power transmission device 24 so that the work vehicle 1 moves forward. When the operating position of the operating device 25a is the reverse position, the controller 26 controls the drive unit 12 or the power transmission device 24 so that the work vehicle 1 moves backward.

The control mode setting device 25b is, for example, a touch panel type of input device. However, the setting device 25b may be another input device such as a switch. The control modes include a load mode and a mode according to the blade specification, as discussed below. The load mode can be selected from among "light," "normal," and "heavy" modes. "Light" is a control mode in which the load on the blade 18 is light. "Heavy" is a control mode in which the load on the blade 18 is heavy. "Normal" is a control mode in which the load on the blade 18 is between "light" and "heavy."

The blade specification can be selected from "full" mode and "semi" mode, for example. "Full" mode is the control mode when a large blade 18 is mounted, and "semi" mode is the control mode when a small blade 18 is mounted.

The controller 26 is programmed to control the work vehicle 1 on the basis of acquired data. The controller 26 includes a processing device such as a CPU, for example. The controller 26 acquires an operation signal from the operating device 25a. The controller 26 controls the control valve 27 on the basis of the operation signal. The controller 26 is not limited to a single unit, and may be divided up into a plurality of controllers.

The control valve 27 is a proportional control valve and is controlled by a command signal from the controller 26. The control valve 27 is disposed between the hydraulic pump 23 and a hydraulic actuator such as the lift cylinder 19. The control valve 27 controls the flow of hydraulic fluid supplied from the hydraulic pump 23 to the lift cylinder 19. The controller 26 generates a command signal to the control valve 27 so that the blade 18 operates according to the operation of the operating device 25a discussed above. Consequently, the lift cylinder 19 is controlled according to the operation amount of the operating device 25a. The control valve 27 may be a pressure proportional control valve. Alternatively, the control valve 27 may be an electromagnetic proportional control valve.

Figure 3:
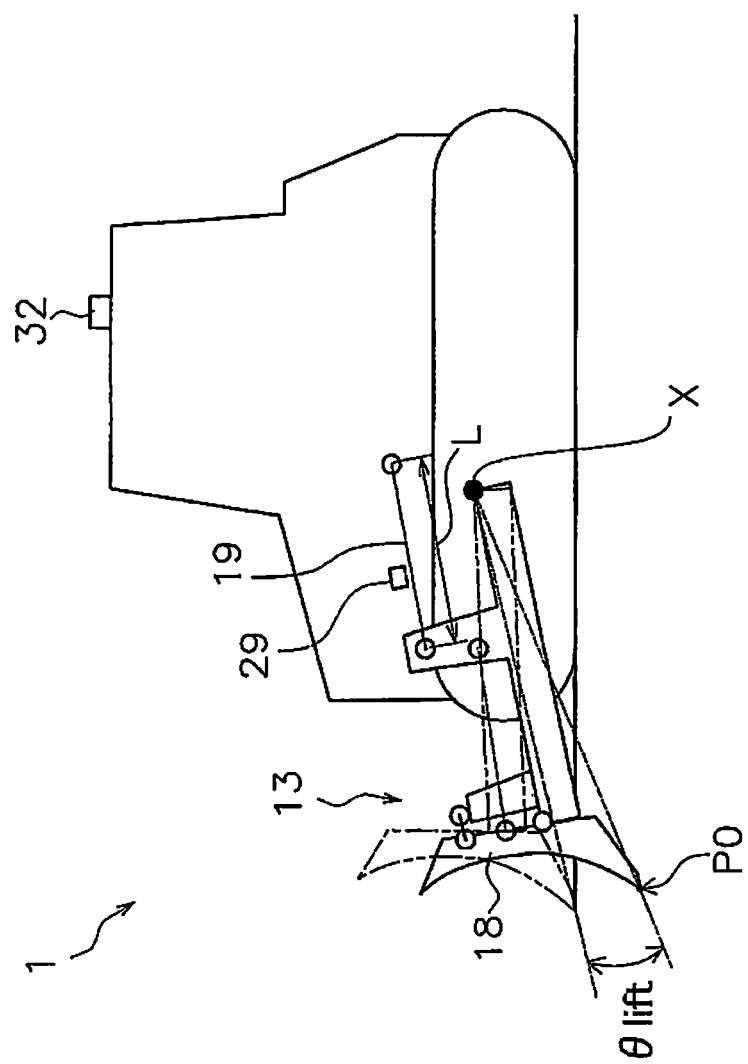
FIG. 3 is a simplified diagram of the configuration of the work vehicle.

The control system 3 includes a lift cylinder sensor 29. The lift cylinder sensor 29 senses the stroke length of the lift cylinder 19 (hereinafter referred to as "lift cylinder length L"). As shown in FIG. 3, the controller 26 calculates the lift angle θlift of the blade 18 on the basis of the lift cylinder length L. FIG. 3 is a simplified diagram of the configuration of the work vehicle 1.

In FIG. 3, the origin position of the work implement 13 is indicated by a two-dot chain line. The origin position of the work implement 13 is the position of the blade 18 in a state in which the cutting edge of the blade 18 is in contact with the ground on a horizontal surface. The lift angle θlift is the angle of the work implement 13 from the origin position.

As shown in FIG. 2, the control system 3 includes a position sensing device 31. The position sensing device 31 measures the position of the work vehicle 1. The position sensing device 31 includes a GNSS (global navigation satellite system) receiver 32 and an IMU 33. The GNSS receiver 32 is, for example, a GPS (global positioning system) receiver. The antenna of the GNSS receiver 32 is disposed on the cab 14. The GNSS receiver 32 receives positioning signals from a satellite and calculates the position of the antenna based on the positioning signal to generate vehicle position data. The controller 26 acquires vehicle position data from the GNSS receiver 32.

The IMU 33 is an inertial measurement unit. The IMU 33 acquires vehicle inclination angle data and vehicle acceleration data. The vehicle inclination angle data includes the angle of the vehicle longitudinal direction with respect to the horizontal (pitch angle), and the angle of the vehicle lateral direction with respect to the horizontal (roll angle). The vehicle acceleration data includes the acceleration of the work vehicle 1. The controller 26 acquires the travel direction and speed of the work vehicle 1 from the vehicle acceleration data. The controller 26 acquires vehicle inclination angle data and vehicle acceleration data from the IMU 33.

The controller 26 calculates a cutting edge position P0 from the lift cylinder length L, the vehicle position data, and the vehicle inclination angle data. As shown in FIG. 3, the controller 26 calculates the global coordinates of the GNSS receiver 32 based on the vehicle position data. The controller 26 calculates the lift angle θlift based on the lift cylinder length L. The controller 26 calculates the local coordinates of the cutting edge position P0 with respect to the GNSS receiver 32 based on the lift angle θlift and vehicle size data. The controller 26 calculates the travel direction and speed of the work vehicle 1 from the vehicle acceleration data. The vehicle size data is stored in the storage device 28 and indicates the position of the work implement 13 with respect to the GNSS receiver 32. The controller 26 calculates the global coordinates of the cutting edge position P0 based on the global coordinates of the GNSS receiver 32, the local coordinates of the cutting edge position P0, and the vehicle inclination angle data. The controller 26 acquires the global coordinates of the cutting edge position P0 as cutting edge position data.

The control system 3 includes a storage device 28. The storage device 28 includes, for example, a memory and an auxiliary storage device. The storage device 28 may be, for example, a RAM, a ROM, or the like. The storage device 28 may be a semiconductor memory, a hard disk, or the like. The storage device 28 is an example of a non-transitory computer-readable recording medium. The storage device 28 records computer commands which is executable by a processor for controlling the work vehicle 1.

The storage device 28 stores design terrain data and work site terrain data. The design terrain data indicates the final design terrain. The final design terrain is the final target contour of the surface of the work site. The design terrain data is, for example, an earthmoving execution plan in a three-dimensional data format. The work site terrain data indicates the current terrain at the work site. The work site terrain data is, for example, a current topographical survey in a three-dimensional data format. The work site terrain data can be obtained by aerial laser survey, for example.

The controller 26 acquires the current terrain data. The current terrain data indicates the current terrain at the work site. The current terrain at the work site is the terrain of the region along the travel direction of the work vehicle 1. The current terrain data is acquired by calculation in the controller 26 from the work site terrain data and the position and travel direction of the work vehicle 1 obtained from the above-mentioned position sensing device 31. The controller 26 automatically controls the work implement 13 on the basis of the current terrain data, the design terrain data, and the cutting edge position data.

The automatic control of the work implement 13 may be semi-automatic control performed together with manual operation by the operator. Alternatively, the automatic control of the work implement 13 may be fully automatic control performed without any manual operation by an operator.

Figure 4:
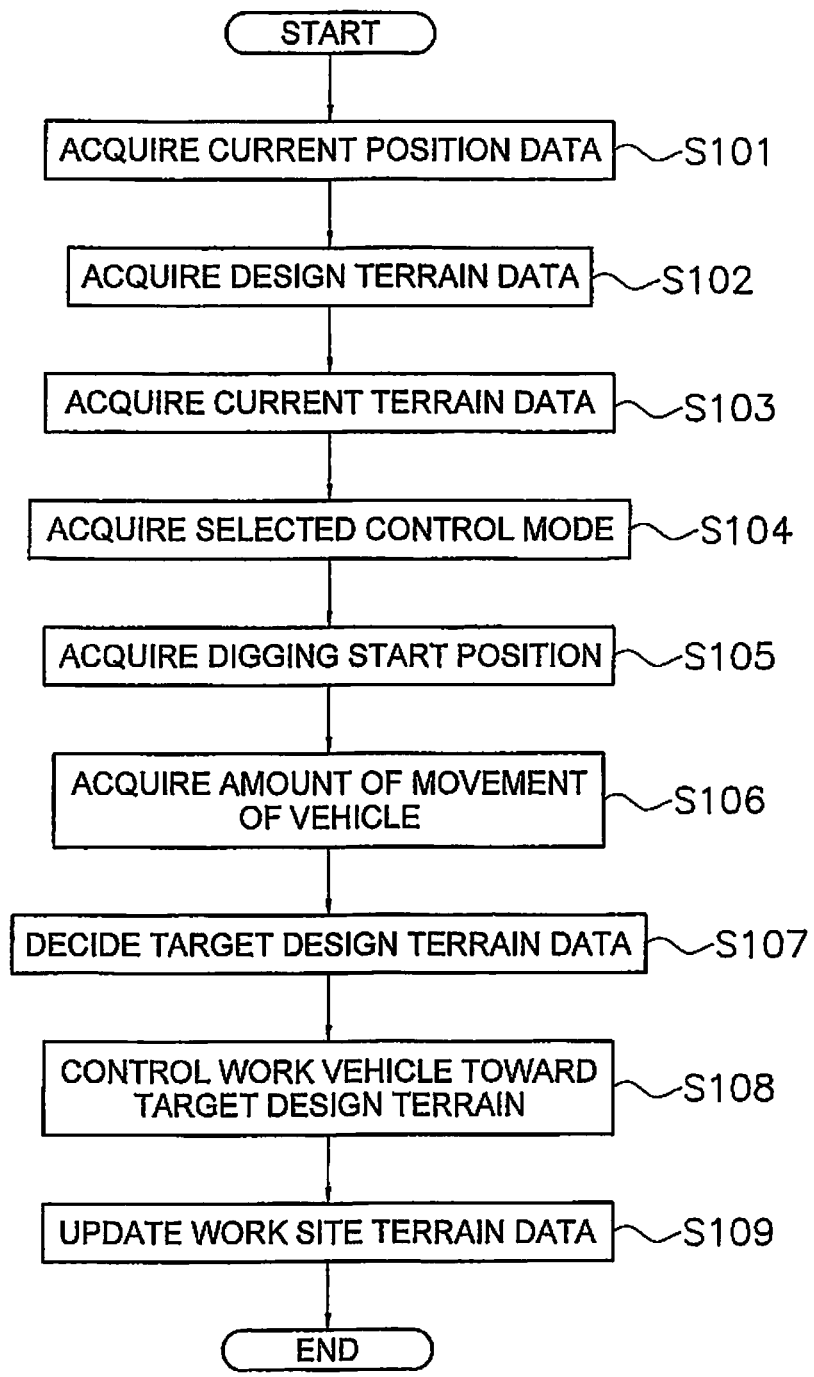
FIG. 4 is a flowchart of the processing in the automatic control of the work implement.

The automatic control of the work implement 13 in digging work executed by the controller 26 will now be described. FIG. 4 is a flowchart of the processing involved in automatic control of the work implement 13 in digging work.

As shown in FIG. 4, in step S101, the controller 26 acquires current position data. Here, the controller 26 acquires the current cutting edge position P0 of the blade 18 as discussed above.

Figure 5:
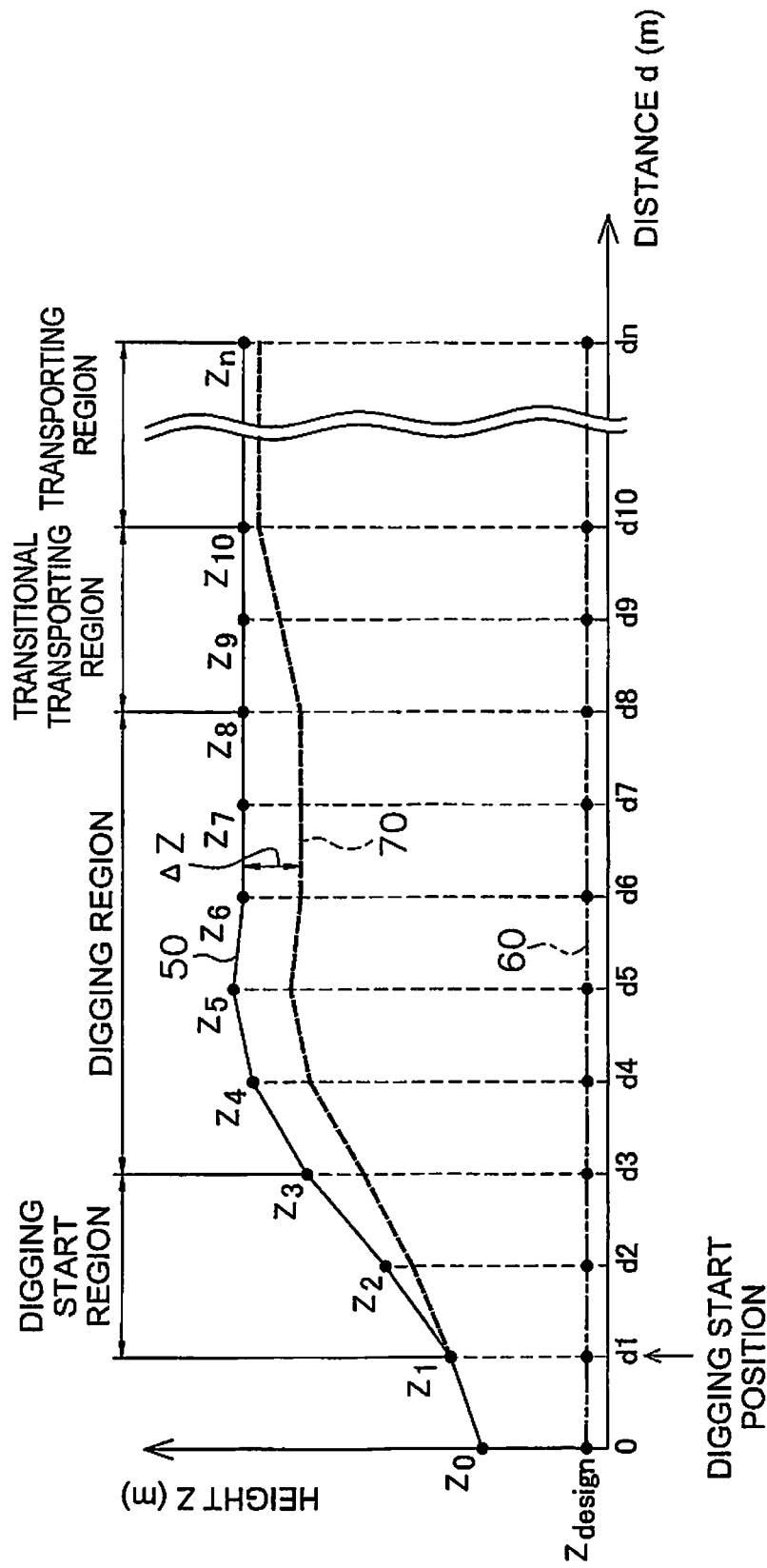
FIG. 5 is a diagram showing an example of a final design terrain, a current terrain, and a target design terrain.

In step S102, the controller 26 acquires design terrain data. As shown in FIG. 5, the design terrain data includes the height $Z_{design}$ of the final design terrain 60 at a plurality of reference points in the travel direction of the work vehicle 1. The plurality of reference points indicate a plurality of points at specific intervals along the travel direction of the work vehicle 1. The plurality of reference points are on the travel path of the blade 18. In FIG. 5, the final design terrain 60 has a flat contour parallel to the horizontal direction, but it may have a different contour.

In step S103, the controller 26 acquires the current terrain data. The controller 26 acquires the current terrain data by calculation from the work site terrain data obtained from the storage device 28, and the vehicle position data and the travel direction data obtained from the position sensing device 31.

The current terrain data is information indicating the terrain located in the travel direction of the work vehicle 1. FIG. 5 is a cross section of the current terrain 50. In FIG. 5, the vertical axis is the height of the terrain, and the horizontal axis is the distance from the current position in the travel direction of the work vehicle 1.

More precisely, the current terrain data includes the heights $Z0$ to $Zn$ of the current terrain 50 at a plurality of reference points up to a specific terrain recognition distance do from the current position in the travel direction of the work vehicle 1. In this embodiment, the current position is a position determined on the basis of the current cutting edge position P0 of the work vehicle 1. However, the current position may be determined on the basis of the current position of another part of the work vehicle 1. The plurality of reference points are arranged at specific intervals, such as every meter.

In step S104, the controller 26 acquires the selected control mode. The controller 26 acquires the control mode selected by the above-mentioned setting device 25b.

In step S105, the controller 26 acquires the digging start position. For example, the controller 26 acquires as the digging start position the position when the cutting edge position P0 first drops below the height Z0 of the current terrain 50. Consequently, the position at which the cutting edge of the blade 18 is lowered and digging of the current terrain 50 is started is acquired as the digging start position. However, the controller 26 may acquire the digging start position by some other method. For example, the controller 26 may acquire the digging start position on the basis of the operation of the operating device 25a. For instance, the controller 26 may acquire the digging start position on the basis of the operation of a button, a screen operation with a touch panel, etc.

In step S106 the controller 26 acquires the amount of movement of the work vehicle 1. The controller 26 acquires the distance traveled from the digging start position to the current position in the travel path of the blade 18 as the amount of movement. The amount of movement of the work vehicle 1 may be the amount of movement of the vehicle body 11. Alternatively, the amount of movement of the work vehicle 1 may be the amount of movement of the cutting edge of the blade 18.

In step S107 the controller 26 decides the target design terrain data. The target design terrain data shows the target design terrain 70 indicated by a broken line in FIG. 5. The target design terrain 70 indicates the desired trajectory of the cutting edge of the blade 18 in operation. The target design terrain 70 is the terrain profile desired as the result of the digging work. As shown in FIG. 5, the controller 26 decides the target design terrain 70 that is displaced downward from the current terrain 50 by the displacement distance $\Delta Z$. The displacement distance $\Delta Z$ is the target displacement in the vertical direction at each reference point. In this embodiment, the displacement distance ΔZ is the target depth at each reference point, and indicates the target position of the blade 18 below the current terrain 50. The target position of the blade 18 means the cutting edge position of the blade 18. In other words, the displacement distance ΔZ indicates the soil volume per unit of movement dug by the blade 18. Therefore, the target design terrain data indicates the relation between a plurality of reference points and a plurality of target soil volumes.

The controller 26 decides the target design terrain 70 so as not to go below the final design terrain 60. Therefore, the controller 26 decides the target design terrain 70 located at or above the final design terrain 60 and below the current terrain 50 during digging work.

More precisely, the controller 26 decides the height Z of the target design terrain 70 according to the following formula (1).

$$Z = Zm - \Delta Z$$

$$\Delta Z = t1 * t2 * Z\_offset \quad \text{Formula (1)}$$

Zm (m=1, ..., n) is the height Z0 to Zn of the current terrain 50 at a plurality of reference points. ΔZ is the displacement distance, and indicates the digging depth in FIG. 5. Symbol t1 is a multiple based on traction force data indicating the magnitude of the traction force that can be utilized by the work vehicle. The traction force data is decided according to the selected load mode. The value of t1 increases in the order of a load mode of "light," "normal," and "heavy."

Symbol t2 is a multiple according to the blade specification data. The blade specification data is decided according to the selected blade specification. In "full" mode t2 is greater than in "semi" mode.

Figure 6:
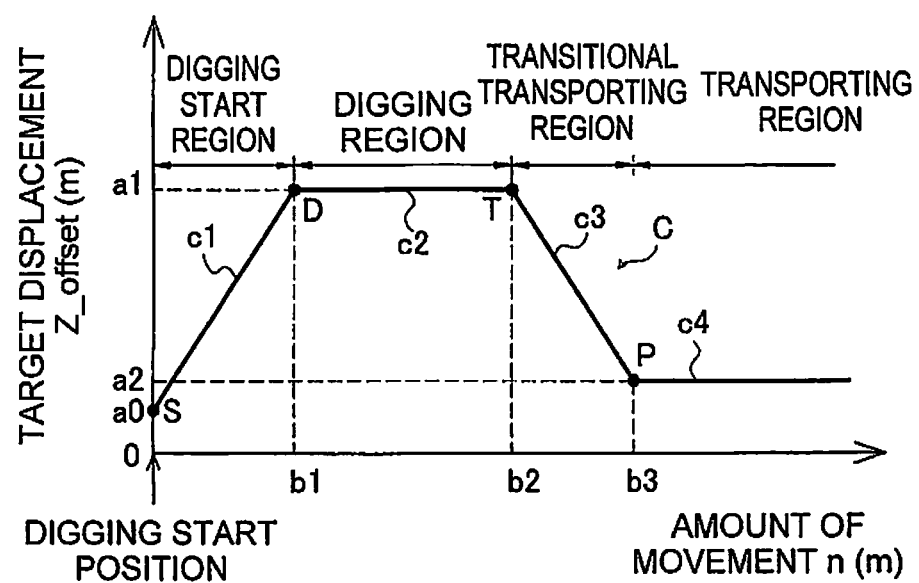
FIG. 6 is a diagram showing an example of target displacement data.

Z_offset is the target displacement decided according to the amount of movement of the work vehicle 1. The target displacement Z_offset is an example of a target load parameter related to the load on the blade 18. The target displacement Z_offset indicates the amount of displacement in the height direction (vertical direction) of the blade 18 from the ground surface. FIG. 6 is a graph of an example of the target displacement data C. The target displacement data C indicates the digging depth (target displacement) Z_offset of the blade 18 in the vertical downward direction from the ground surface as a dependent variable of the amount of movement n of the work vehicle 1 in the horizontal direction. The amount of movement n of the work vehicle 1 in the horizontal direction is substantially the same as the amount of movement of the blade 18 in the horizontal direction. The controller 26 decides the target displacement Z_offset from the amount of movement n of the work vehicle 1 by referring to the target displacement data C shown in FIG. 6.

As shown in FIG. 6, the target displacement data C defines the relation between the amount of movement n of the work vehicle 1 and the target displacement Z_offset. The target displacement data C is stored in the storage device 28. For the sake of simplicity in the following description, it is assumed that the displacement distance ΔZ is equal to the target displacement Z_offset, and the values of t1 and t2 are both 1.

As shown in FIG. 6, the target displacement data C includes data at start c1, data during digging c2, data during transition c3, and data during transporting c4. The data at start c1 defines the relation between the amount of movement n in the digging start region and the target displacement Z_offset. The digging start region is the region from the digging starting point S to the steady digging starting point D. As indicated by the data at start c1, the target displacement Z_offset that gradually increases according to the increase in the amount of movement n is defined in the digging start region. The data at start c1 defines the target displacement Z_offset that linearly increases with respect to the amount of movement n.

The data during digging c2 defines the relation between the amount of movement n in the digging region and the target displacement Z_offset. The digging region is the region (first region) from the steady digging starting point D to the transitional transporting starting point T. As indicated by the data during digging c2, in the digging region, the target displacement Z_offset is defined as a constant value. The data during digging c2 defines a constant target displacement Z_offset with respect to the amount of movement n.

The data during transition c3 defines the relation between the amount of movement n and the target displacement Z_offset in the transitional transporting region. The transitional transporting region is the region from the steady digging end point T to the transporting starting point P. As indicated by the data during transition c3, the target displacement Z_offset that gradually decreases according to the increase in the amount of movement n is defined in the transitional transporting region. The data during transition c3 defines the target displacement Z_offset that linearly decreases with respect to the amount of movement n.

The data during transporting c4 defines the relation between the amount of movement n in the transporting region and the target displacement Z_offset. The transporting region is the region (second region) starting from the transporting starting point P. As indicated by the data during transporting c4, the target displacement Z_offset is defined as a constant value in the transporting region. The data during transporting c4 defines a constant target displacement Z_offset with respect to the amount of movement n.

More precisely, the digging region starts at a first start value b1 and ends at a first end value b2. The transporting region starts at a second start value b3. The first end value b2 is less than the second start value b3. Therefore, the digging region is started when the amount of movement n is less than that in the transporting region. The target displacement Z_offset in the digging region is constant at a first target value a1. The target displacement Z_offset in the transporting region is constant at a second target value a2. The first target value a1 is greater than the second target value a2. Therefore, in the digging region, the displacement distance ΔZ is defined to be greater than in the transporting region.

The target displacement Z_offset at the digging start position is a start value a0. The start value a0 is less than the first target value a1. The start target value a0 is also less than the second target value a2.

Figure 7:
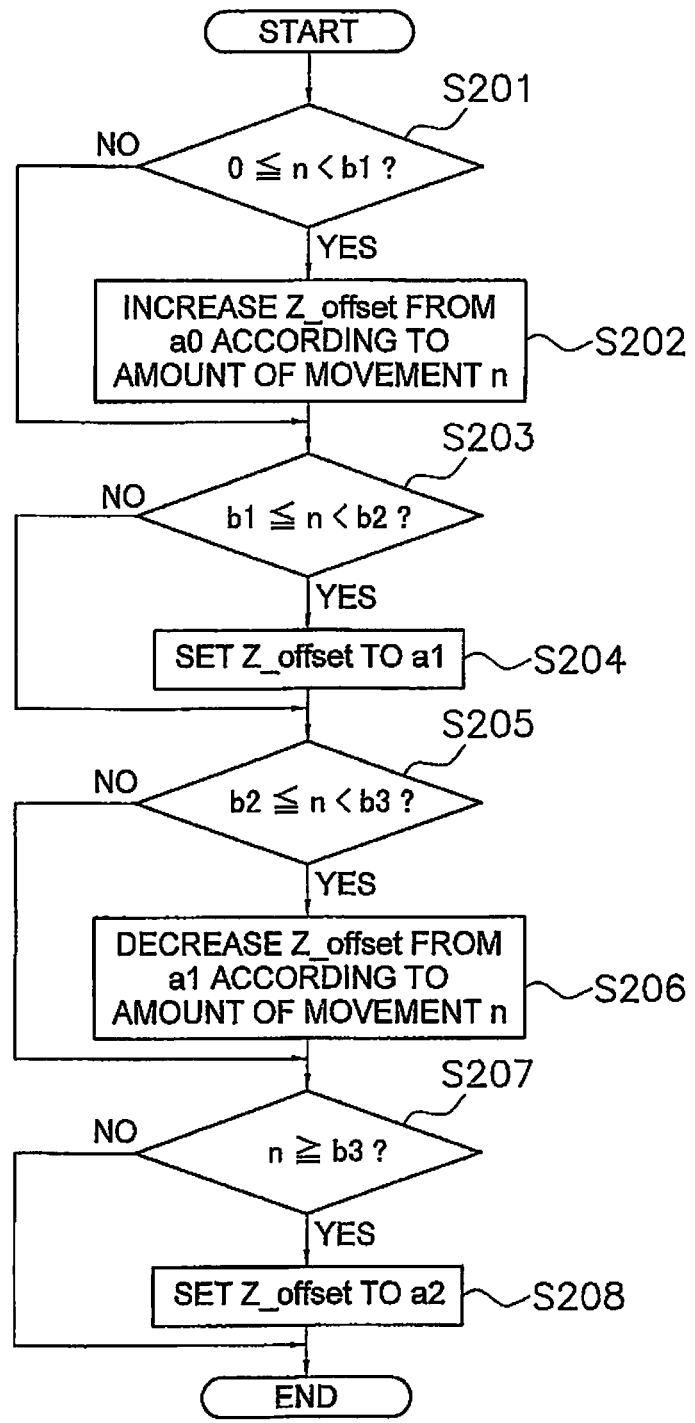
FIG. 7 is a flowchart of the processing for deciding a target displacement.

FIG. 7 is a flowchart showing the processing for deciding the target displacement Z_offset. In order to simplify the description, let us assume that in the decision processing described below, the travel of the work vehicle 1 is only forward. The decision processing is started when the operating device 25a moves to the forward position. In step S201, the controller 26 determines whether the amount of movement n is equal to or greater than 0 and less than the first start value b1. When the amount of movement n is equal to or greater than 0 and less than the first start value b1, in step S202 the controller 26 gradually increases the target displacement Z_offset from the start value a0 according to the increase in the amount of movement n.

The start value $a0$ is a constant and is stored in the storage device 28. It is preferable for the start value $a0$ to be small enough that the load on the blade 18 at the start of digging will not be excessively high. The first start value $b1$ is found by calculation from the gradient $c1$ in the digging start region shown in FIG. 6, the start value $a0$, and the first target value $a1$. The gradient $c1$ is a constant and is stored in the storage device 28. It is preferable for the gradient $c1$ to be a value at which it is possible to transition quickly from the digging start to the digging work, and the load on the blade 18 will not be excessively high.

In step S203 the controller 26 determines whether the amount of movement $n$ is equal to or greater than the first start value $b1$ and less than the first end value $b2$. When the amount of movement $n$ is equal to or greater than the first start value $b1$ and less than the first end value $b2$, in step S204 the controller 26 sets the target displacement Z_offset to the first target value $a1$. The first target value $a1$ is a constant and is stored in the storage device 28. It is preferable for the first target value $a1$ to be a value at which digging can be performed efficiently and the load on the blade 18 will not be excessively high.

In step S205 the controller 26 determines whether the amount of movement $n$ is equal to or greater than the first end value $b2$ and less than the second start value $b3$. When the amount of movement $n$ is equal to or greater than the first end value $b2$ and less than the second start value $b3$, in step S206 the controller 26 gradually decreases the target displacement Z_offset from the first target value $a1$ according to the increase in the amount of movement $n$.

The first end value $b2$ is the amount of movement when the current held soil volume of the blade 18 is over a specific threshold. Therefore, when the current held soil volume of the blade 18 goes over a specific threshold, the controller 26 decreases the target displacement Z_offset from the first target value $a1$. This specific threshold is decided on the basis of the maximum capacity of the blade 18, for example. For instance, the current held soil volume of the blade 18 may be decided by measuring the load on the blade 18 and calculating from this load. Alternatively, the current held soil volume of the blade 18 may be calculated by using a camera to capture an image of the blade 18 and analyzing this image.

At the start of work, a specific initial value is set as the first end value $b2$. After the start of work, the amount of movement when the held soil volume of the blade 18 goes over a specific threshold is stored as an update value, and the first end value $b2$ is updated on the basis of the stored update value.

In step S207 the controller 26 determines whether the amount of movement $n$ is equal to or greater than the second start value $b3$. When the amount of movement $n$ is equal to or greater than the second start value $b3$, in step S208 the controller 26 sets the target displacement Z_offset to the second target value $a2$.

The second target value $a2$ is a constant and is stored in the storage device 28. The second target value $a2$ is preferably set to a value suitable for transporting work. The second start value $b3$ is found by calculation from the gradient $c2$ in the transitional transporting region shown in FIG. 6, the first target value $a1$, and the second target value $a2$. The gradient $c2$ is a constant and is stored in the storage device 28. It is preferable for the gradient $c2$ to be a value at which it is possible to transition quickly from digging work to transporting work, and the load on the blade 18 will not be excessively high.

The start value $a0$, the first target value $a1$, and the second target value $a2$ may be changed according to the situation of the work vehicle 1, etc. The first start value $b1$, the first end value $b2$, and the second start value $b3$ may be stored in the storage device 28 as constants.

As described above, deciding the target displacement Z_offset also decides the height Z of the target design terrain 70.

In step S108 shown in FIG. 4, the controller 26 controls the blade 18 toward the target design terrain 70. Here, the controller 26 generates a command signal to the work implement 13 so that the cutting edge position of the blade 18 is moved toward the target design terrain 70 produced in step S107. The generated command signal is inputted to the control valve 27. Consequently, the cutting edge position P0 of the work implement 13 moves along the target design terrain 70.

In the above-mentioned digging region, the displacement distance $\Delta Z$ between the current terrain 50 and the target design terrain 70 is greater than in other regions. Consequently, in the digging region, digging work is performed on the current terrain 50. In the transporting region, the displacement distance $\Delta Z$ between the current terrain 50 and the target design terrain 70 is less than in other areas. Consequently, in the transporting region, digging of the ground surface is held off, and soil held in the blade 18 is conveyed.

In step S109 the controller 26 updates the work site terrain data. The controller 26 acquires, as current terrain data, position data indicating the latest trajectory of the cutting edge position P0, and updates the work site terrain data with the acquired current terrain data. Alternatively, the controller 26 may calculate the position of the bottom face of the crawler belt 16 from the vehicle body position data and the vehicle body size data, and acquire position data indicating the trajectory of the bottom face of the crawler belt 16 as current terrain data. In this case, the updating of the work terrain data can be carried out instantly.

Alternatively, the current terrain data may be generated from survey data measured by a surveying device outside the work vehicle 1. Aerial laser surveying may be used as an external surveying device, for example. Alternatively, the current terrain 50 may be photographed with a camera, and current terrain data may be generated from the image data obtained by the camera. For example, aerial photographic surveying using a UAV (unmanned aerial vehicle) may be used. In the case of an external surveying device or a camera, the work site terrain data is updated at specific intervals, or whenever needed.

The above processing is executed when the work vehicle 1 is moving forward. For example, the above processing is executed when the operating device 25*a* of the drive unit 12 is in to the forward position. However, if the work vehicle 1 travels in reverse by at least a specific distance, the digging start position and the amount of movement $n$ are initialized. The held soil volume of the blade 18 is also initialized. The controller 26 decides and updates the target design terrain 70 with respect to a plurality of reference points every time the work vehicle advances a specific distance. However, the controller 26 may maintain the initially decided target design terrain 70 until the work vehicle is switched from forward to reverse.

The above processing is executed when the work vehicle 1 moves forward again. The controller 26 updates the current terrain 50 based on the updated work site terrain data, and decides the new target design terrain 70 on the basis of the updated current terrain 50. The controller 26 then controls the blade 18 along the newly decided target design terrain 70. This processing is repeated to perform digging so that the current terrain 50 approaches the final design terrain 60.

With the control system 3 of the work vehicle 1 according to this embodiment and described above, the controller 26 decides the displacement distance ΔZ according to the amount of movement n by referring to target displacement data. The controller 26 then decides a target design terrain 70 that is displaced vertically by the displacement distance ΔZ from the current terrain 50. Thus controlling the blade 18 toward the target design terrain 70 allows the work to be carried out more smoothly, without producing large bumps or valleys.

In digging work, when the amount of movement n of the work vehicle 1 is small, the held soil volume of the blade 18 is also small. Therefore, digging work can be performed more efficiently by setting a large displacement distance ΔZ in the digging region where the amount of movement n is small.

When the amount of movement n of the work vehicle 1 is large, the held soil volume of the blade 18 is also large. Therefore, the held soil volume can be prevented from becoming too large by setting a small displacement distance ΔZ in the transporting region where the amount of movement n of the work vehicle 1 is large. This prevents an excessive load from being exerted on the blade 18. Or, the amount of soil that leaks from the blade 18 can be kept low.

The controller 26 decides the first end value b2 to be the amount of movement n of the work vehicle 1 at the point when the current held soil volume goes over a specific threshold. This more accurately prevents the held soil volume from becoming excessive.

An embodiment of the present invention was described above, but the present invention is not limited to or by the above embodiment, and various modifications are possible without departing from the gist of the invention.

The work vehicle 1 is not limited to a bulldozer, and may be some other vehicle such as a wheel loader or a motor grader.

The work vehicle 1 may also be a vehicle that can be operated remotely. In that case, part of the control system 3 may be located outside of the work vehicle 1. For example, the controller 26 may be located outside of the work vehicle 1. The controller 26 may be disposed in a control center that is away from the work site.

Figure 8:
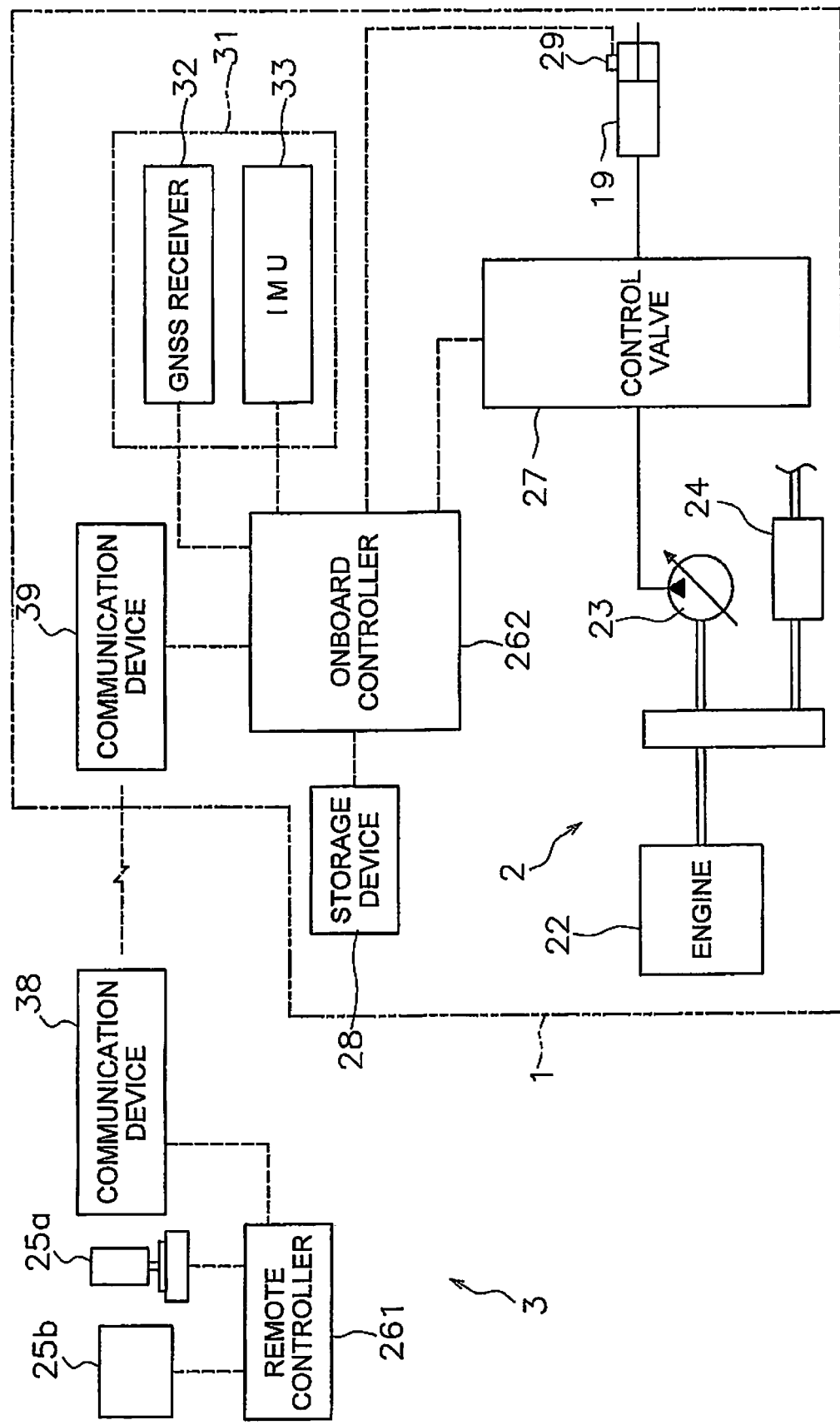
FIG. 8 is a block diagram of the configuration of the control system according to a first modification example.

The controller 26 may have a plurality of controllers separate from one another. For example, as shown in FIG. 8, the controller 26 may include a remote controller 261 disposed outside of the work vehicle 1 and an onboard controller 262 installed in the work vehicle 1. The remote controller 261 and the onboard controller 262 may be capable of communicating wirelessly via communication devices 38 and 39. Some of the functions of the controller 26 discussed above may be executed by the remote controller 261, and the rest by the onboard controller 262. For example, processing for deciding the target design terrain 70 may be executed by the remote controller 261, and processing for outputting a command signal to the work implement 13 may be performed by the onboard controller 262.

The operating device 25a may be disposed outside of the work vehicle 1. In that case, the cab may be omitted from the work vehicle 1. Alternatively, the operating device 25a may be omitted from the work vehicle 1. The work vehicle 1 may be operated by automatic control under the controller 26 alone, without any input from the operating device 25a.

Figure 9:
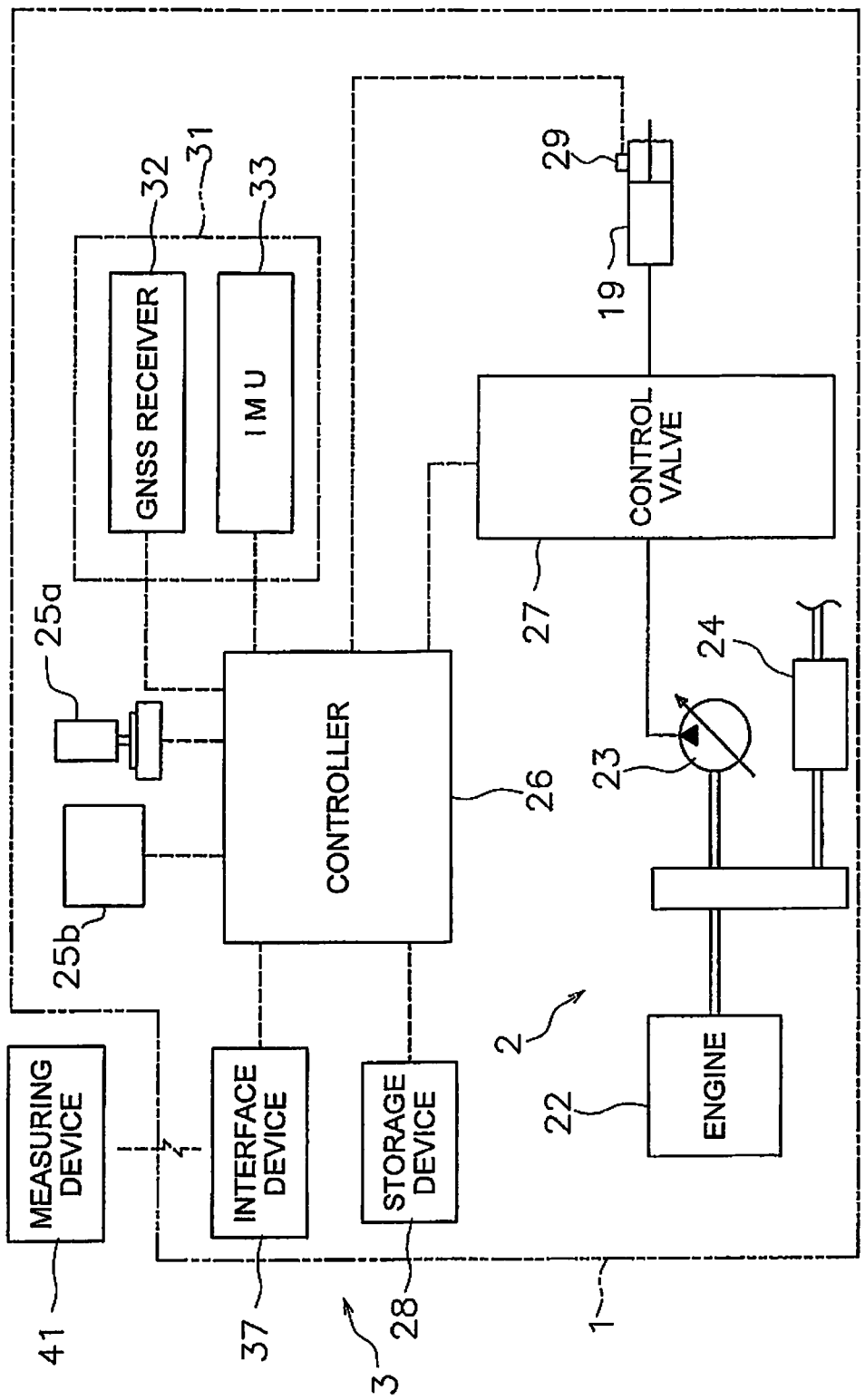
FIG. 9 is a block diagram of the configuration of the control system according to a second modification example.

The current terrain 50 may be acquired from some other device besides the above-mentioned position detecting device 31. For example, as shown in FIG. 9, the current terrain 50 may be acquired by an interface device 37 that receives data from an external device. The interface device 37 may wirelessly receive current terrain data measured by an external measuring device 41. Alternatively, the interface device 37 may be a recording medium reader and may receive current terrain data measured by the external measuring device 41 via a recording medium.

The controller 26 may decide the target design terrain 70 on the basis of the current terrain 50 that has been smoothed. That is, the controller 26 may decide the target design terrain 70 that has been displaced by the displacement distance ΔZ from the smoothed current terrain 50. Smoothing means processing to smooth out the height changes in the current terrain 50. For example, the controller 26 smoothes the heights Z0 to Zn at a plurality of points in the current terrain 50 according to the following formula (2).

$$Z_{n\_sm} = \left( \sum_{k=n-2}^{n+2} Z_k \right) / 5 \qquad \text{Formula 2}$$

Zn_sm indicates the height of each point in the smoothed current terrain 50. In Formula 2, smoothing is performed using the average value for height at five points. However, the number of points used in the smoothing may be less than five or greater than five. The number of points used for smoothing can be varied, and the operator can set the desired degree of smoothing by changing the number of points used for smoothing. Also, what is calculated is not limited to the average value of the height of a point to be smoothed and points ahead and behind, and may also be the average value of the height of a point to be smoothed and points ahead. Alternatively, the average value of the height of a point to be smoothed and points ahead and behind may be calculated. Or, some other smoothing processing may be used, and not just the average value.

Figure 10:
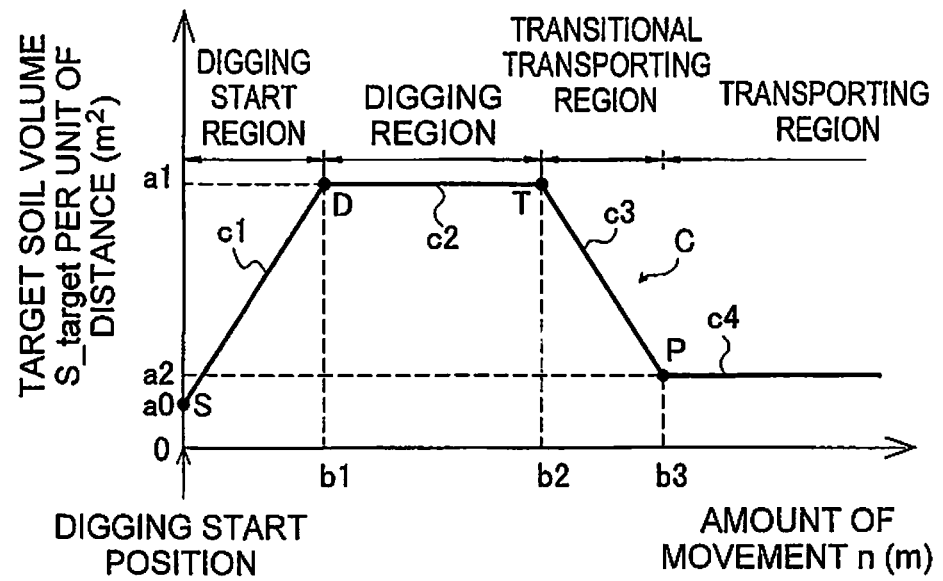
FIG. 10 is a diagram showing an example of target load parameter data.

As long as it is a parameter related to the load on the work implement 13, the target load parameter is not limited to target displacement as in the above embodiment. For example, FIG. 10 is a diagram showing another example of target load parameter data. As shown in FIG. 10, the target load parameter may be the target soil volume S_target for each point in a flat terrain. Specifically, the target load parameter may be the target soil volume S_target per unit of distance. For example, the controller 26 can calculate the displacement distance ΔZ from the target soil volume S_target and the width of the blade 13. Alternatively, the target load parameter may be a parameter that is different from the target soil volume S_target per unit of distance. For example, the target load parameter may be a parameter indicating the target value of the load on the work implement 13 at each point. The controller 26 can calculate the displacement distance ΔZ at each point from the target load parameter. In that case, the controller 26 may increase the displacement distance ΔZ according to the increase in the target load parameter.

Figure 11:
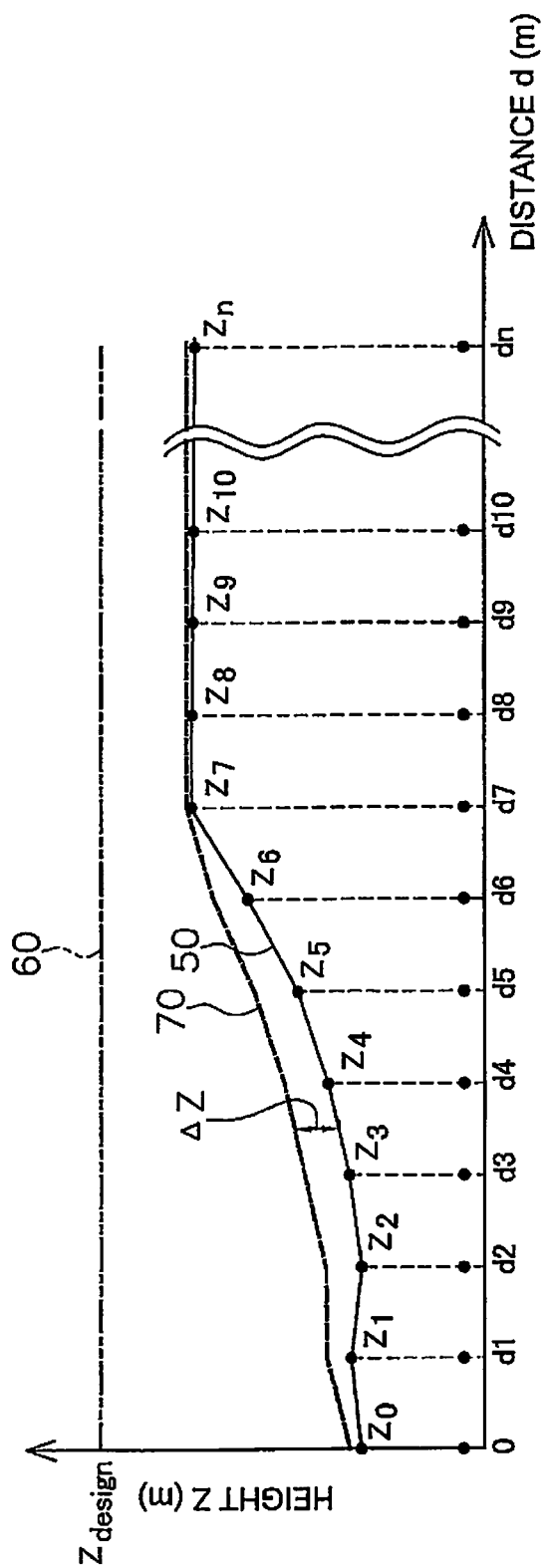
FIG. 11 is a diagram showing another example of a target design terrain.
Figure 12:
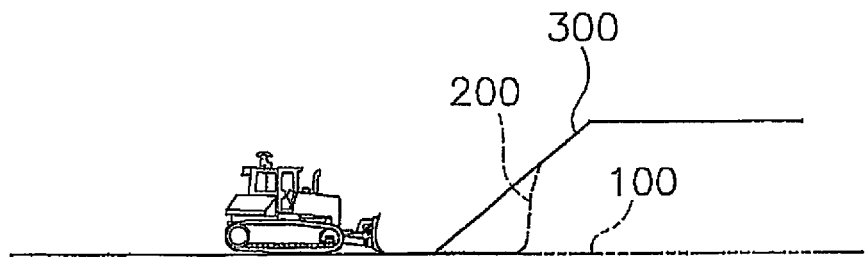
FIG. 12 is a diagram of digging work in prior art.

As shown in FIG. 11, the controller 26 may decide a target design terrain 70 that is displaced upward by the displacement distance ΔZ from the current terrain 50. In this case, it is possible to perform embankment work instead of digging work.

INDUSTRIAL APPLICABILITY

With the present invention, a work vehicle can be made to perform work efficiently and with good finish quality under automatic control.

The invention claimed is:

1. A control system for a work vehicle including a work implement, the control system comprising:
    a controller programmed to
        acquire current terrain data indicating current terrain to be worked,
        decide a target design terrain displaced vertically from the current terrain by referring to target displacement data indicating target displacement of the work implement according to an amount of movement from a work start position, and
        generate a command signal to move the work implement toward the target design terrain.

2. The control system for a work vehicle according to claim 1, wherein
    the target displacement data includes a first region and a second region,
    the first region is a region that begins when the amount of movement is smaller than in the second region, and
    in the first region, the target displacement is defined to be greater than in the second region.

3. The control system for a work vehicle according to claim 2, wherein
    the target displacement data includes a transitional region located between the first region and the second region, and
    in the transitional region, the target displacement is defined to decrease gradually according to increase in the amount of movement.

4. The control system for a work vehicle according to claim 2, wherein
    the target displacement data includes a digging start region located between the first region and a digging start position, and
    in the digging start region, the target displacement is defined to increase gradually according to increase in the amount of movement.

5. The control system for a work vehicle according to claim 2, wherein
    the target displacement is constant at a first target value in the first region, and
    the target displacement is constant at a second target value in the second region, with the second target value being less than the first target value.

6. The control system for a work vehicle according to claim 2, wherein
    with the target displacement data, the first region ends when the amount of movement is a first end value, and
    the controller is further programmed to
        acquire a current held soil volume of the work implement,
        acquire the amount of movement of the work vehicle at a point when the current held soil volume exceeds a specific threshold, as an updated value for the first end value, and
        update the first end value to the updated value when the updated value is less than a current value of the first end value.

7. The control system for a work vehicle according to claim 1, wherein
    the controller is further programmed to
        acquire a current held soil volume of the work implement,
        determine whether the current held soil volume is greater than a specific threshold, and
        update the target displacement data based on a result of determining whether the current held soil volume is greater than the specific threshold.

8. The control system for a work vehicle according to claim 1, wherein
    the controller is further programmed to
        accept a control mode selected from a plurality of control modes, and
        change the target displacement according to the selected control mode.

9. The control system for a work vehicle according to claim 1, wherein
    the controller is further programmed to
        perform smoothing of the current terrain, and
        decide the target design terrain displaced vertically by the target displacement from the smoothed current terrain.

10. The control system for a work vehicle according to claim 1, wherein
    the work implement includes a blade, and
    the amount of movement from the work start position is an amount of movement of the blade.

11. A method for setting a trajectory of a work implement of a work vehicle, the method comprising:
    acquiring current terrain data indicating current terrain to be worked;
    deciding a target design terrain displaced vertically from the current terrain by referring to target displacement data indicating target displacement of the work implement according to an amount of movement from a work start position;
    setting the target design terrain as the trajectory of the work implement and
    generating a command signal to move the work implement toward the target design terrain.

12. The method for setting the trajectory of a work implement according to claim 11, wherein
    the target displacement data includes a first region and a second region,
    the first region is a region that begins when the amount of movement is smaller than in the second region, and
    in the first region, the target displacement is defined to be greater than in the second region.

13. The method for setting the trajectory of a work implement according to claim 12, wherein
    the target displacement data includes a transitional region located between the first region and the second region, and
    in the transitional region, the target displacement is defined to decrease gradually according to increase in the amount of movement.

14. The method for setting the trajectory of a work implement according to claim 11, further comprising:
    acquiring a current held soil volume of the work implement,
    determining whether the current held soil volume is greater than a specific threshold, and
    updating the target displacement data based on a result of determining whether the current held soil volume is greater than the specific threshold.

15. The method for setting the trajectory of a work implement according to claim 11, further comprising:
    accepting a control mode selected from a plurality of control modes, and
    changing the target displacement according to the selected control mode.

16. The method for setting the trajectory of a work implement according to claim 11, further comprising:
- performing smoothing of the current terrain; and
- deciding the target design terrain displaced vertically by the target displacement from the smoothed current terrain.

17. A control system for a work vehicle including a work implement, the control system comprising:
- a controller programmed to
  - acquire current terrain data indicating current terrain to be worked,
  - decide a target design terrain displaced vertically from the current terrain by referring to a target load parameter that defines relation between an amount of movement from a work start position and a target load parameter that defines a load on the work implement, and
  - generate a command signal to move the work implement toward the target design terrain.

18. The control system for a work vehicle according to claim 17, wherein
- the target design terrain is displaced vertically with respect to the current terrain, and
- the controller is further programmed to decide a target displacement between the current terrain and the target design terrain according to a magnitude of the target load parameter.

19. The control system for a work vehicle according to claim 17, wherein
- the target load parameter indicates a target soil volume of the work implement.

20. The control system for a work vehicle according to claim 17, wherein
- the target design terrain is displaced vertically with respect to the current terrain, and
- the target load parameter indicates the target displacement between the current terrain and the target design terrain.

21. The control system for a work vehicle according to claim 17, wherein
- the target load parameter includes a first region and a second region,
- the first region is a region that begins when the amount of movement is smaller than in the second region, and
- in the first region, the target load parameter is defined to be greater than in the second region.

22. The control system for a work vehicle according to claim 21, wherein
- the target load parameter includes a transitional region located between the first region and the second region, and
- in the transitional region, the target load parameter is defined to decrease gradually according to increase in the amount of movement.

23. The control system for a work vehicle according to claim 17, wherein
- the controller is further programmed to
  - acquire a current held soil volume of the work implement,
  - determine whether the current held soil volume is greater than a specific threshold, and
  - update the target load parameter data based on a result of determining whether the current held soil volume is greater than the specific threshold.

24. The control system for a work vehicle according to claim 17, wherein
- the controller is further programmed to
  - accept a control mode selected from a plurality of control modes, and
  - change the target load parameter according to the selected control mode.

* * * * *